(12) United States Patent
Cheng (10) Patent No.: US 10,684,175 B2
(45) Date of Patent: Jun. 16, 2020

(54) SUBSTRATE AND DISPLAY DEVICE

(71) Applicants: BOE Technology Group Co., Ltd., Beijing (CN); Hefei Xinsheng Optoelectronics Technology Co., Ltd., Hefei (CN)

(72) Inventor: Xiaoliang Cheng, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 498 days.

(21) Appl. No.: 15/306,923

(22) PCT Filed: Feb. 26, 2016

(86) PCT No.: PCT/CN2016/074709
§ 371 (c)(1),
(2) Date: Oct. 26, 2016

(87) PCT Pub. No.: WO2017/008511
PCT Pub. Date: Jan. 19, 2017

(65) Prior Publication Data
US 2017/0167924 A1    Jun. 15, 2017

(30) Foreign Application Priority Data

Jul. 10, 2015    (CN) .......................... 2015 1 0408880

(51) Int. Cl.
*G01K 1/14*      (2006.01)
*G02F 1/1333*   (2006.01)
(Continued)

(52) U.S. Cl.
CPC ............... *G01K 1/14* (2013.01); *G01K 7/028* (2013.01); *G01K 7/16* (2013.01); *G01K 7/186* (2013.01);
(Continued)

(58) Field of Classification Search
CPC .......... G01K 1/14; G01K 7/186; G01K 7/028; G01K 7/16; G02F 1/13338; G02F 1/1309;
(Continued)

(56) References Cited

U.S. PATENT DOCUMENTS 5,150,969 A  *  9/1992 Goldberg ................. G01J 5/02
                                                               374/128
6,191,839 B1 *  2/2001 Briley ............... G02F 1/133382
                                                               349/161
(Continued)

FOREIGN PATENT DOCUMENTS

CN    1379386 A    11/2002
CN    1819214 A     8/2006
(Continued)

OTHER PUBLICATIONS

May 22, 2017—(CN) First Office Action Appn 201510408880.0 with English Tran.
(Continued)

*Primary Examiner* — Natalie Huls
*Assistant Examiner* — Janice M Soto
(74) *Attorney, Agent, or Firm* — Banner & Witcoff, Ltd.

(57) ABSTRACT

A substrate and a display device are disclosed. The substrate includes: a base substrate; a first temperature sensing section disposed on the base substrate; and a first processing chip connected with the first temperature sensing section. The substrate includes a peripheral area and a central area; one part of the first temperature sensing section is disposed in the peripheral area of the substrate; another part of the first temperature sensing section is disposed in the central area of the substrate; and the first processing chip is configured to convert temperature sensing signals of the central area and the peripheral area of the substrate sensed by the first temperature sensing section into relevant control signals and
(Continued)

output the signals. The above first temperature sensing section can more accurately measure the temperature difference between the peripheral area and the central area of the substrate.

17 Claims, 4 Drawing Sheets (51) Int. Cl.
G01K 7/02 (2006.01)
G01K 7/18 (2006.01)
G01K 7/16 (2006.01)
G02F 1/13 (2006.01)
G02F 1/1362 (2006.01)

(52) U.S. Cl.
CPC ........ *G02F 1/1309* (2013.01); *G02F 1/13338* (2013.01); *G02F 1/136286* (2013.01); *G02F 2001/136295* (2013.01); *G02F 2201/121* (2013.01); *G02F 2201/123* (2013.01)

(58) Field of Classification Search
CPC ......... G02F 1/136286; G02F 2201/123; G02F 2201/121; G02F 2001/136295
See application file for complete search history.

(56) References Cited

U.S. PATENT DOCUMENTS 6,777,961 B2 * 8/2004 Hamamoto ............... G01J 5/12
136/227
2012/0113340 A1 * 5/2012 Yaguma ............... G09G 3/3614
349/33
2013/0293109 A1 * 11/2013 Cheon ................ H05B 33/0887
315/122
2014/0036953 A1 * 2/2014 Kimura ..................... G01J 5/16
374/121
2014/0291527 A1 * 10/2014 Okudo ................. G01J 1/0407
250/353

FOREIGN PATENT DOCUMENTS

| CN | 2824088 Y | | 10/2006 |
| CN | 1920505 A | * | 2/2007 |
| CN | 1920505 A | | 2/2007 |
| CN | 201083912 Y | | 7/2008 |
| CN | 103852924 A | | 6/2014 |
| CN | 104090418 A | | 10/2014 |
| CN | 204101846 U | | 1/2015 |
| CN | 104898741 A | | 9/2015 |
| JP | S58106524 A | | 12/1984 |
| JP | H980393 A | | 3/1997 |

OTHER PUBLICATIONS

May 24, 2016—(WO)—International Search Report and Written Opinion Appn PCT/CN2016/074709 with English Tran.
Sep. 21, 2017—(CN) Second Office Action Appn 201510408880.0 with English Tran.

* cited by examiner

SUBSTRATE AND DISPLAY DEVICE

The application is a U.S. National Phase Entry of International Application No. PCT/CN2016/074709 filed on Feb. 26, 2016, designating the United States of America and claiming priority to Chinese Patent Application No. 201510408880.0, filed Jul. 10, 2015. The present application claims priority to and the benefit of the above-identified applications and the above-identified applications are incorporated by reference herein in their entirety.

TECHNICAL FIELD

Embodiments of the present disclosure relate to a substrate and a display device.

BACKGROUND

Currently, temperature has a great influence on the properties of important components in a substrate. In the actual application of a liquid crystal display (LCD) panel, it is usually necessary to accurately measure the temperature of internal important components to ensure the normal display of the substrate.

The main current method for the temperature measurement is to detect the temperature variation of a controlled position in the LCD panel via a temperature sensor provided outside the LCD panel. However, as the temperature sensor is exposed to the outside of the LCD panel and tends to be affected by the external environment, the sensitivity of the temperature sensor can be reduced. In addition, as a temperature sensing component should be externally connected, not only is the cost increased but also the volume is increased. Moreover, the ambient temperature detected by the temperature sensor cannot accurately reflect the actual temperature of components such as thin-film transistors (TFTs) in the array substrate and liquid crystals.

Therefore, how to accurately measure the internal temperature of the substrate is the technical problem to be solved by those skilled in the art.

SUMMARY

Embodiments of the present disclosure provide a substrate and a display device, which can accurately measure the temperature of a peripheral area and a central area of the substrate and cannot affect the light transmittance of the substrate.

In a first aspect, an embodiment of the present disclosure provides a substrate, comprising: a base substrate; a first temperature sensing section disposed on the base substrate; and a first processing chip connected with the first temperature sensing section; the substrate includes a peripheral area and a central area; one part of the first temperature sensing section is disposed in the peripheral area of the substrate; another part of the first temperature sensing section is disposed in the central area of the substrate; and the first processing chip is configured to convert temperature sensing signals of the central area and the peripheral area of the substrate sensed by the first temperature sensing section into relevant control signals and output the signals.

In a second aspect, another embodiment of the present disclosure provides a display device comprising the above substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Detailed description will be given below to the exemplary embodiments of the substrate and the display device, provided by the embodiment of the present disclosure, with reference to the accompanying drawings.

The thickness and the shape of layers in the accompanying drawings do not reflect the real scale of the substrate and are only intended to illustrate the content of the embodiments of the present disclosure.

Figure 1:
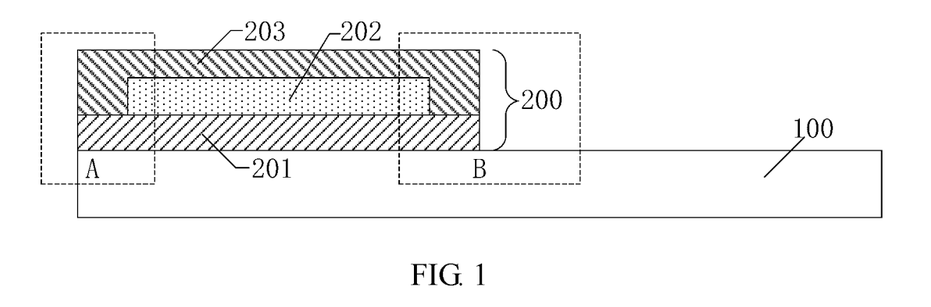
FIG. 1 is a structural sectional view of a substrate provided by an embodiment of the present disclosure.

An embodiment of the present disclosure provides a substrate, which, as illustrated in FIG. 1, comprises: a base substrate 100 and a first temperature sensing section 200 disposed on the base substrate 100, in which in one possible example, the first temperature sensing section 200 is transparent; and a first processing chip (not shown in FIG. 1) connected with the first temperature sensing section 200. The substrate includes a peripheral area A and a central area B. One part of the first temperature sensing section 200 is disposed in the peripheral area A of the substrate, and the other part of the first temperature sensing section 200 is disposed in the central area B of the substrate. The first processing chip is disposed on the substrate. In one embodiment, the first processing chip is disposed in the peripheral area A of the base substrate and configured to convert temperature sensing signals (e.g., temperature difference signals) of the central area B and the peripheral area A of the substrate sensed by the first temperature sensing section 200 into relevant control signals, e.g., voltage signals corresponding to the temperature difference signals, and output the signals.

In the substrate provided by the embodiment of the present disclosure, the first temperature sensing section disposed in the substrate can accurately measure the temperature of the peripheral area and the central area of the substrate. In one possible example, the first temperature sensing section disposed in the substrate can accurately measure the temperature difference between the peripheral area and the central area of the substrate, so as to satisfy the requirement of some special temperature measurement situations and ensure the normal display of the substrate. In addition, the case that one part of the first temperature sensing section covers the peripheral area A of the substrate is favorable for signal processing.

Illustratively, in the substrate provided by the embodiment of the present disclosure, the first temperature sensing section may be provided according to the Seebeck effect (namely the thermocouple working principle). As illustrated in FIG. 1, the first temperature sensing section 200 may include: a first conductive layer 201, an intermediate insulating spacer layer 202 and a second conductive layer 203 superimposed on the base substrate 100 in sequence; the coverage area of the intermediate insulating spacer layer 202 is less than that of the first conductive layer 201; the intermediate insulating spacer layer 202 is configured to divide the first conductive layer 201 into two isolated areas, namely a first area and a second area; the first area is disposed in the peripheral area A of the substrate and the second area is disposed in the central area B of the substrate; and the projection of the second conductive layer 203 and the projection of the first conductive layer 201 on the base substrate 100 are overlapped. Illustratively, as the coverage area of the intermediate insulating spacer layer 202 is less than that of the first conductive layer 201, as illustrated in FIG. 1, a left end of the first conductive layer 201 and a left end of the second conductive layer 203 are connected with each other; a right end of the first conductive layer 201 and a right end of the second conductive layer 203 are connected with each other; the region in which the left ends are located is the first area; and the region in which the right ends are located is the second area. The region provided with the left ends therein is disposed in the peripheral area A of the substrate, and the region provided with the right ends therein is disposed in the central area B of the substrate. Thus, a closed loop can be formed. When there is temperature difference between two ends and there is generated a temperature gradient, an electrical current will flow by the loop. At this point, thermal electromotive force is generated between the two ends. The phenomenon is referred to as Seebeck effect. Elements for measuring the temperature by the means of measuring the thermal electromotive force, namely the first conductive layer and the second conductive layer, are referred to as a thermocouple. The thermal electromotive force generated by the thermocouple is only relevant to the material of thermodes and the temperature difference between the two ends but irrelevant to the length and the diameter of the thermodes. The configuration has the advantages of simple structure, easy production, low cost, high accuracy and wide temperature measuring range.

Moreover, illustratively, in the substrate provided by the embodiment of the present disclosure, the materials of the first conductive layer, the intermediate insulating spacer layer and the second conductive layer may all be transparent materials, namely the first temperature sensing section is transparent, so that the first temperature sensing section cannot reduce the aperture ratio in a display area of the substrate and hence cannot affect the light transmittance.

Illustratively, the material of the first conductive layer or the material of the second conductive layer may be a semiconductor material or a conductor material, e.g., one selected from indium tin oxide (ITO), tin oxide (TO), tin antimony oxide (TAO), indium oxide (IO), cadmium oxide (CdO) or graphene; and the material of the intermediate insulating spacer layer may be an inorganic transparent insulating material such as silicon nitride. For instance, the materials of the first conductive layer, the second conductive layer and the intermediate insulating spacer layer may be selected according to actual conditions. No limitation will be given here.

Illustratively, in the substrate provided by the embodiment of the present disclosure, there are ways for forming the first temperature sensing section on the base substrate. The first temperature sensing section may be directly formed on a surface of the substrate. In order to not increase the process complexity, the first temperature sensing section may also be formed in the substrate. For instance, the first conductive layer may be arranged in the same layer as an electrode layer or metal wires in the substrate, so that patterns of the first conductive layer and the electrode layer or the metal wires may be formed by one patterning process, and hence the process can be simplified and the cost can be saved; and/or the second conductive layer may be arranged in the same layer as an electrode layer or metal wires in the substrate, so that patterns of the second conductive layer and the electrode layer or the metal wires can be formed by one patterning process, and hence the process can be simplified and the cost can be saved. It should be noted that the electrode layer in the substrate may include a pixel electrode layer, a common electrode layer or the like, and the metal wires in the substrate may include gate lines, data lines or the like. The specific setting of the first conductive layer and the second conductive layer may be specifically designed according to actual demands. The substrate provided by the embodiment of the present disclosure may include the following embodiments.

In a first embodiment, the substrate provided by the embodiment of the present disclosure may be applied in a twisted nematic (TN) display panel. For instance, the pixel electrode layer is disposed on the surface of the substrate; the first conductive layer 201 is arranged in the same layer as the pixel electrode layer; the second conductive layer 203 is formed independently by depositing a transparent material; and the intermediate insulating spacer layer 202 is disposed between the first conductive layer 201 and the second conductive layer 203.

Figure 2:
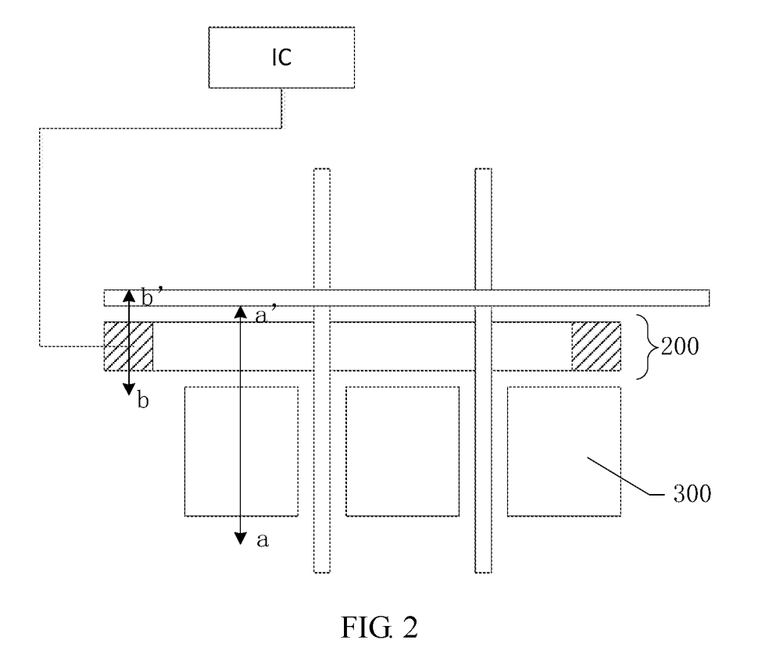
FIG. 2 is a plan view of the substrate provided by an embodiment of the present disclosure.
Figure 3:
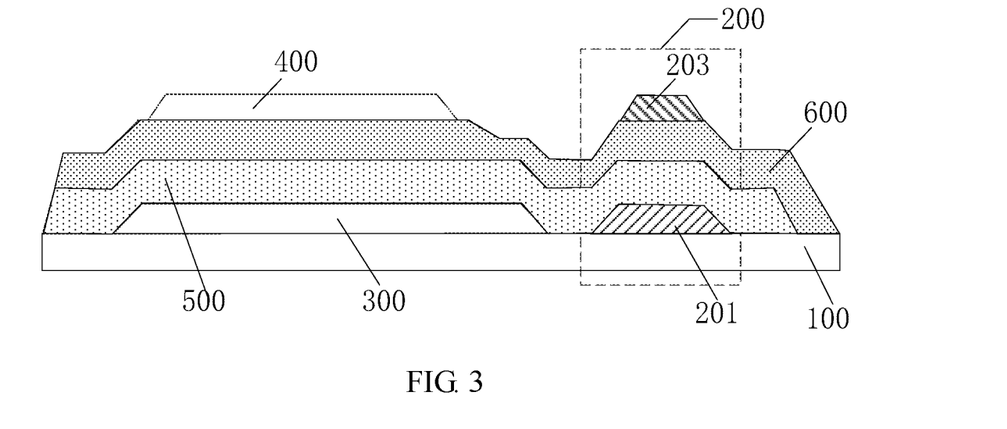
FIG. 3 is a schematic structural sectional view of FIG. 2 along the a-a' direction in the embodiment of the present disclosure.
Figure 4:
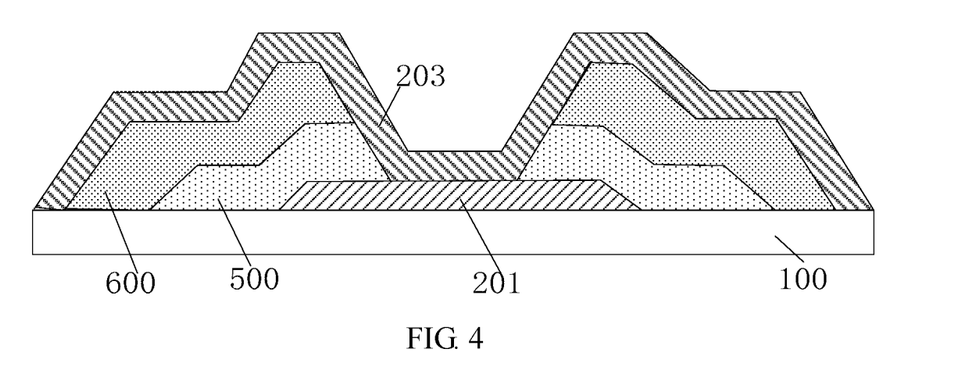
FIG. 4 is a schematic structural sectional view of FIG. 2 along the b-b' direction in the embodiment of the present disclosure.

In a second embodiment, the substrate provided by the embodiment of the present disclosure may be applied in an advanced super dimension switch (ADS) display panel. For instance, as illustrated in FIGS. 2 to 4, a common electrode layer 300 in the substrate is provided in plate-like electrodes and disposed on the lower layer, and a pixel electrode layer 400 is provided in slit electrodes and disposed on the upper layer, namely the pixel electrode layer 400 is disposed above the common electrode layer 300. An insulating layer 500 and a passivation layer 600 are disposed between the pixel electrode layer 400 and the common electrode layer 300. The first conductive layer 201 and the common electrode layer 300 are arranged in the same layer, and the second conductive layer 203 and the pixel electrode layer 400 are arranged in the same layer. In this case, the pixel electrode layer and the common electrode layer may be made from different materials, or the second conductive layer and the pixel electrode layer may be made from different materials. For example, the pixel electrode layer is made from ITO, and the second conductive layer may be made from graphene. As illustrated in FIG. 4, both ends of the first conductive layer 201 are respectively correspondingly connected with both ends of the second conductive layer 203 via through holes.

In a third embodiment, the substrate provided by the embodiment of the present disclosure may also be applied to a high advanced super dimension switch (HADS) display panel. For instance, the pixel electrode layer in the substrate is provided in plate-like electrodes and disposed on the lower layer, and the common electrode layer is provided in slit electrodes and disposed on the upper layer, namely the pixel electrode layer is disposed below the common electrode layer. An insulating layer and a passivation layer are disposed between pixel electrodes and common electrodes. The first conductive layer and the pixel electrode layer are arranged in the same layer, and the second conductive layer and the common electrode layer are arranged in the same layer. In this case, the pixel electrode layer and the common electrode layer may be made from different materials, or the second conductive layer and the common electrode layer may be made from different materials. For example, the common electrode layer is made from ITO, and the second conductive layer is made from graphene (patterns of the third embodiment are similar to patterns of the second embodiment, only requiring position exchange between the pixel electrode layer and the common electrode layer).

In the above embodiments, the first temperature sensing sections are all disposed in the substrates. Thus, the manufacturing process can be simplified; the cost can be saved; the thicknesses of the substrates can be reduced accordingly; and the measuring accuracy can be improved. The above embodiments are only intended to illustrate the examples of the present disclosure. In practice, the present disclosure is not limited to the above three embodiments. In practice, the above embodiments can be specifically selected according to actual demands. No limitation will be given here.

Figure 5:
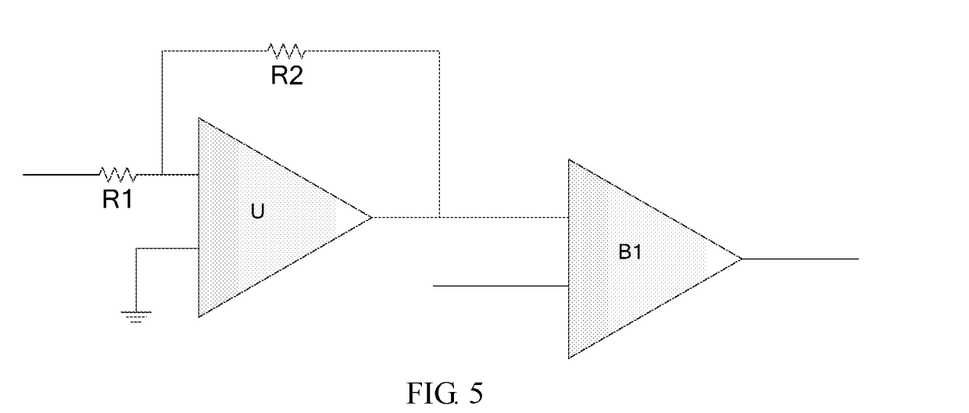
FIG. 5 is a schematic diagram of a peripheral processing circuit of a first processing chip in the substrate provided by an embodiment of the present disclosure.

Illustratively, in the substrate provided by an embodiment of the present disclosure, when there is temperature difference between the peripheral area and the central area of the substrate, there will be an output voltage (the output voltage is generally 10-100mV for example). In this case, the first processing chip includes a first peripheral processing circuit. As illustrated in FIG. 5, the first peripheral processing circuit includes a first resistor R1, a second resistor R2, an operational amplifier U and a first comparator B1; a first input end of the operational amplifier U is respectively connected with one end of the first resistor R1 and one end of the second resistor R2; a second input end of the operational amplifier U is grounded; an output end of the operational amplifier U is respectively connected with the other end of the second resistor R2 and a first input end of the first comparator B1; the other end of the first resistor R1 is connected with an output voltage end of the first temperature sensing section; a second input end of the first comparator B1 is connected with a first reference voltage end; and an output end of the first comparator B1 is connected with a first control signal end. The operational amplifier U, the resistor R1 and the resistor R2 are combined to provide a negative feedback amplification circuit which may amplify the output voltage of the first temperature sensing section into an appropriate value. The first comparator B1 may compare the reference voltage with the output voltage of the first temperature sensing section, and different values can be outputted in the case of different voltages. The operational amplifier U may be a low temperature drift precision amplifier; the resistor R1 may be set to be 100 ohm; and the resistor R2 may be set to be four thousand (4K) ohm. Thus, the first temperature sensing section will convert the temperature magnitude into the electricity quantity for detection, which is convenient for the measurement and control of the temperature, the amplification and conversion of temperature signals, etc.

Illustratively, the substrate provided by an embodiment of the present disclosure may further comprise: a second temperature sensing section disposed on the base substrate and a second processing chip connected with the second temperature sensing section. The second temperature sensing section is disposed in the peripheral area of the substrate. The second processing chip is disposed in the peripheral area of the substrate and configured to convert a temperature sensing signal of the peripheral area of the substrate sensed by the second temperature sensing section into a relevant control signal (e.g., voltage corresponding to temperature) and output the signal. The second temperature sensing section will not affect the light transmittance and can accurately measure the temperature of the peripheral area of the substrate.

Illustratively, in the substrate provided by the embodiment of the present disclosure, the second temperature sensing section may be formed according to the working principle of thermal resistance and may include a resistance sensor R disposed in the same layer as the metal wires in the substrate; the metal wires in the substrate may include gate lines and data lines; the metallic material may be copper; and the resistance may be 200 ohm. Patterns of the resistance sensor and the metal wires are formed by the same patterning process, so that the process can be simplified and the cost can be saved.

Figure 6:
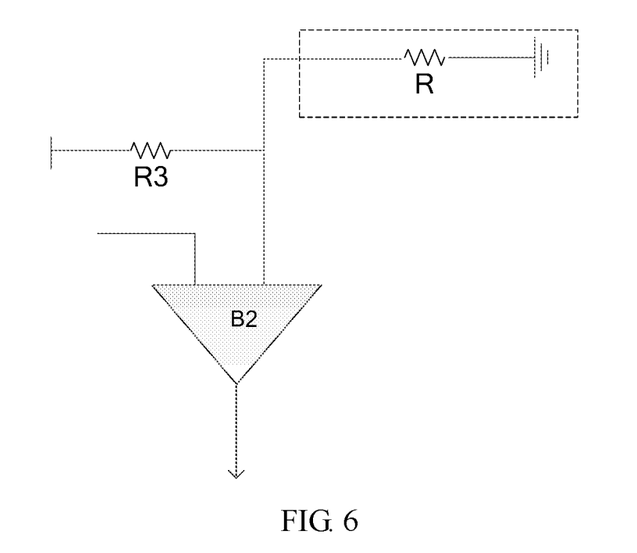
FIG. 6 is a schematic diagram of a peripheral processing circuit of a second processing chip in the substrate provided by an embodiment of the present disclosure.

Illustratively, in the substrate provided by the embodiment of the present disclosure, the second processing chip includes a second peripheral processing circuit. As illustrated in FIG. 6, the second peripheral processing circuit includes a third resistor R3 and a second comparator B2 (not including the resistance sensor R indicated by dotted lines); a first input end of the second comparator B2 is connected with a second reference voltage end; a second input end of the second comparator B2 is respectively connected with one end of the third resistor R3 and the resistance sensor R; an output end of the second comparator B2 is connected with a second control signal end; and the other end of the third resistor R3 is connected with a voltage output end of the second temperature sensing section. The third resistor R3 may be a low temperature drift resistor, and the resistance may be 200 ohm. The second comparator B2 may be a low temperature drift precision operational amplifier, so that the influence of the external temperature on sampling can be reduced. The second temperature sensing section may measure the temperature by utilization of the property that the resistance of the internal component of the substrate is also varied along with the temperature variation, so that the accuracy and the sensitivity can be high. As no reference point is required and the temperature value may be directly resolved according to the measured resistance, the temperature measuring range is wide and the stability is good.

Illustratively, the substrate provided by the embodiment of the present disclosure further comprises: a third processing chip configured to integrate the first processing chip and the second processing chip. As the first processing chip receives the temperature sensing signals (e.g., time difference) of the peripheral area and the central area of the substrate sensed by the first temperature sensing section, and the second processing chip receives the temperature sensing signals (e.g., temperature) of the peripheral area of the substrate sensed by the second temperature sensing section, the third processing chip compares the both kinds of signals and hence can obtain the temperature sensing signals of the central area of the substrate (namely the temperature of the central area of the substrate), and subsequently, converts the temperature sensing signals of the central area of the substrate into relevant control signals (e.g., voltage) and outputs the signals.

Illustratively, in the substrates provided by the embodiments of the present disclosure, the substrates may include a color filter (CF) substrate or an array substrate. No limitation will be given here.

Illustratively, when the substrate provided by the embodiment of the present disclosure is applied to the array substrate, structures such as TFTs, gate electrodes and data lines will also be generally disposed on the array substrate. The specific structures may have a plurality of implementations. No limitation will be given here.

Detailed description will be given below to a method for manufacturing a substrate provided by the embodiment of the present disclosure via a preferred embodiment. The operations of manufacturing the substrate are as follows.

Figure 7A:
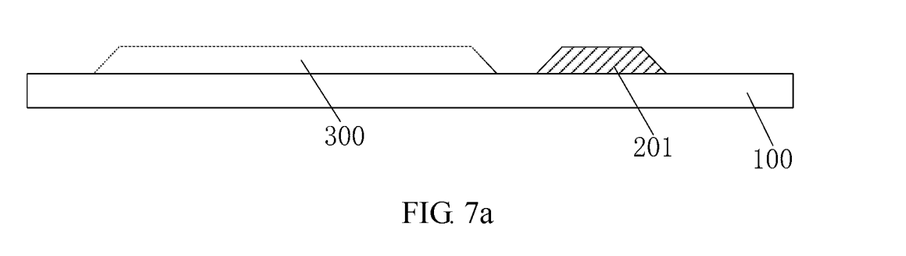
FIGS. 7a to 7e are respectively schematic structural views of a substrate obtained after various steps in a method for manufacturing the substrate provided by an embodiment of the present disclosure.

Step 1: as shown in FIG. 7a, forming patterns of a common electrode layer and a first conductive layer on a base substrate by a single patterning process.

For instance, a transparent conductive material such as ITO may be deposited on the base substrate 100, and patterns of the common electrode layer 300 and the first conductive layer 201 are formed after the processes of exposing, developing and etching process in one patterning process.

Figure 7B:
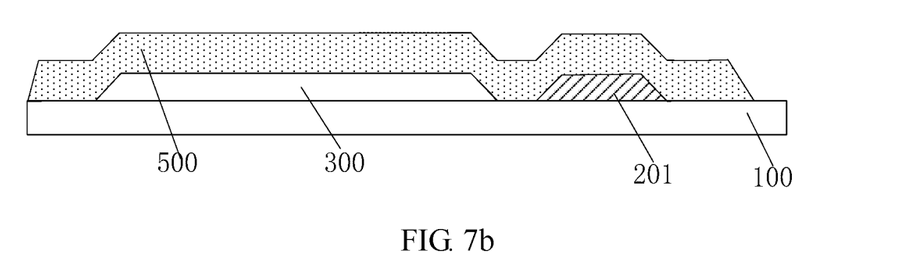

Step 2: as shown in FIG. 7b, depositing a material for forming an insulating layer on the base substrate provided with the common electrode layer and the first conductive layer.

For instance, one layer of insulating material such as silicon nitride is deposited on the base substrate 100 provided with the common electrode layer 300 and the first conductive layer 201 and functions as an insulating layer 500.

Figure 7C:
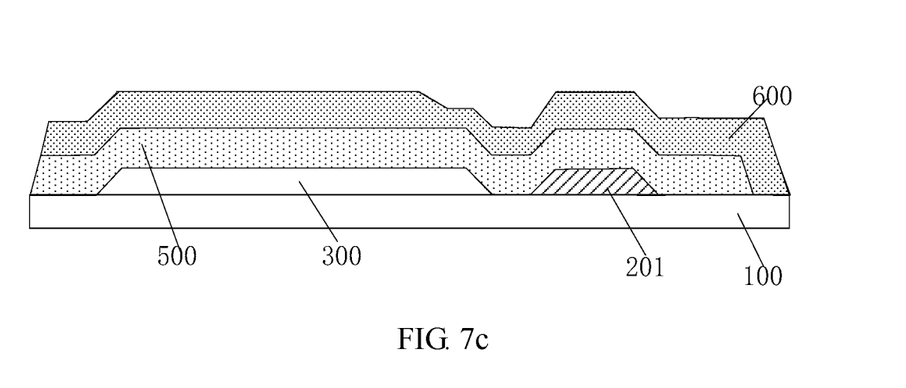

Step 3: as shown in FIG. 7c, forming a pattern of a passivation layer on the insulating layer.

For instance, one layer of a passivation layer material such as silicon nitride are deposited on the base substrate 100 provided with the insulating layer 500 and used as the passivation layer 600.

Figure 7D:
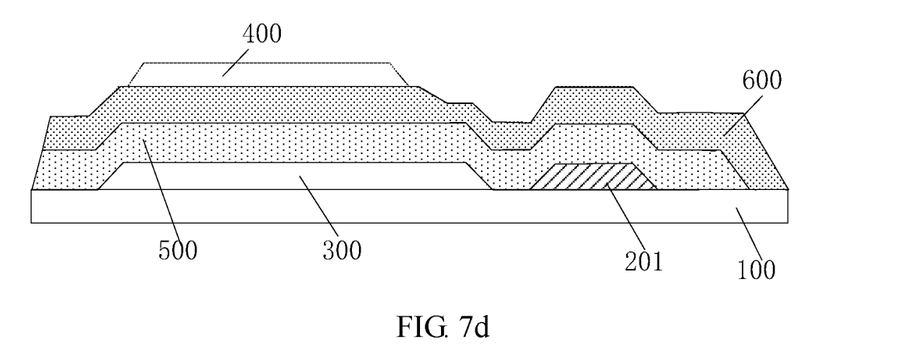

Step 4: as shown in FIG. 7d, forming a pattern of a pixel electrode layer on the passivation layer.

For instance, one layer of a transparent conductive material such as ITO is deposited on the base substrate 100 provided with the passivation layer 600, and a pattern of the pixel electrode layer 400 is formed by a patterning process.

Figure 7E:
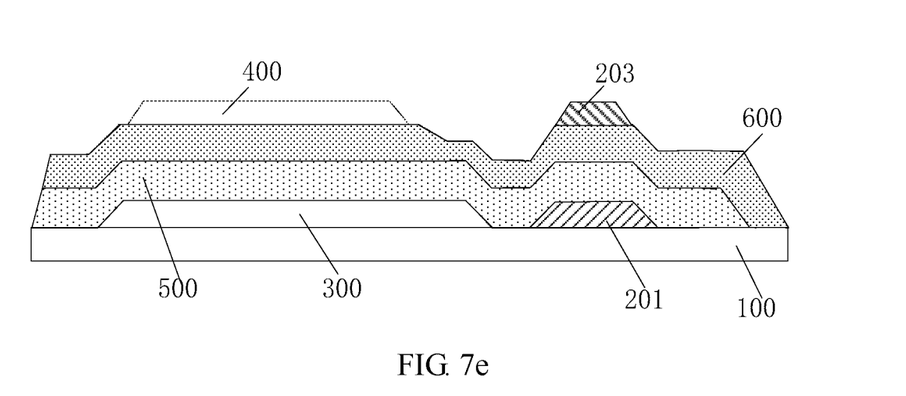

Step 5: as shown in FIG. 7e, forming a pattern of a second conductive layer on the passivation layer.

For instance, through holes are formed in the insulating layer 500 and the passivation layer 600 in regions corresponding to the peripheral area and the central area of the substrate; one layer of graphene is deposited on the base substrate 100 provided with the passivation layer 600; and a pattern of the second conductive layer 203 is formed by a patterning process, in which both ends of the second conductive layer 203 are respectively correspondingly connected with both ends of the first conductive layer 201 via through holes.

Thus, the substrate provided by the embodiment of the present disclosure is manufactured after Step 1 to Step 5 in the embodiment. Compared with the case that the first temperature sensing section is directly formed on the surface of the substrate, the independently arranged intermediate insulating spacer layer is omitted, so that the number of layers of the substrate can be simplified.

Based on the same disclosure concept, the embodiment of the present disclosure further provides a display device, which comprises the substrate provided by an embodiment of the present disclosure. The display device may be: any product or component having display function such as a mobile phone, a tablet PC, a TV, a display, a notebook computer, a digital picture frame and a navigator. It should be understood by those skilled in the art that other necessary components of the display device should be provided. No further description will be given here. The description also should not be construed as the limitation of the present disclosure. The embodiments of the display device may refer to any embodiment of the substrate. No further description will be given here.

The embodiment of the present disclosure provides a substrate and a display device. The substrate comprises: a base substrate, a first temperature sensing section disposed on the base substrate, and a first processing chip connected with the first temperature sensing section. The substrate includes a peripheral area and a central area; one part of the first temperature sensing section is disposed in the peripheral area of the substrate; another part of the first temperature sensing section is disposed in the central area of the substrate; and the first processing chip is disposed in the peripheral area of the substrate and configured to convert temperature sensing signals of the central area and the peripheral area of the substrate sensed by the first temperature sensing section into relevant control signals, e.g., voltage, and output the signals. The first temperature sensing section in the embodiment of the present disclosure may accurately measure the temperature of the peripheral area and the central area of the substrate. In one possible example, the first temperature sensing section disposed in the substrate can accurately measure the temperature difference between the peripheral area and the central area of the substrate, so as to satisfy the requirement of some special temperature measuring situations and ensure the normal display of the substrate.

Obviously, various modifications and deformations can be made to the present disclosure by those skilled in the art without departing from the spirit and scope of the present disclosure. Therefore, if the modifications and deformations of the present disclosure fall within the scope of the appended claims of the present disclosure and equivalents thereof, the present disclosure is also intended to include the modifications and deformations.

The application claims priority to the Chinese patent application No. 201510408880.0, filed Jul. 10, 2015, the entire disclosure of which is incorporated herein by reference as part of the present application.

What is claimed is:

1. A substrate, comprising:
a base substrate;
a first temperature sensing section disposed on the base substrate; and
a first processing chip connected with the first temperature sensing section, wherein
the substrate includes a peripheral area and a central area; one part of the first temperature sensing section is disposed in the peripheral area of the substrate; another part of the first temperature sensing section is disposed in the central area of the substrate; and the first processing chip is configured to convert temperature sensing signals of the central area and the peripheral area of the substrate sensed by the first temperature sensing section into a first control signal and output the first control signal;

the first temperature sensing section includes: a first conductive layer, an intermediate insulating spacer layer and a second conductive layer superimposed on the base substrate in sequence;

the first conductive layer comprises a first end portion, an intermediate portion and a second end portion that are sequentially and directly connected along a first direction, and the second conductive layer comprises a first end portion, an intermediate portion and a second end portion that are sequentially and directly connected along the first direction;

the first end portion of the first conductive layer and the first end portion of the second conductive layer are in direct contact in the peripheral area of the substrate, so as to sense the peripheral area of the substrate and obtain the temperature sensing signal of the peripheral area of the substrate;

the second end portion of the first conductive layer and the second end portion of the second conductive layer are in direct contact in the central area of the substrate, so as to sense the central area of the substrate and obtain the temperature sensing signal of the peripheral area of the substrate;

the intermediate portion of the first conductive layer, the intermediate insulating spacer layer, and the intermediate portion of the second conductive layer are sequentially provided along a direction perpendicular to the base substrate;

a coverage area of the intermediate insulating spacer layer is less than that of the first conductive layer; the intermediate insulating spacer layer is configured to divide the first conductive layer into two isolated areas, namely a first area and a second area; the first area is disposed in the peripheral area of the substrate; the second area is disposed in the central area of the substrate; and a projection of the second conductive layer and a projection of the first conductive layer on the base substrate are overlapped with each other.

2. The substrate according to claim 1, wherein the second conductive layer and the first conductive layer make direct contact in both the first area and the second area.

3. The substrate according to claim 1, wherein the first conductive layer or the second conductive layer is made from one selected from indium tin oxide (ITO), tin oxide (TO), tin antimony oxide (TAO), indium oxide (TO), cadmium oxide (CdO) or graphene; and the intermediate insulating spacer layer is made from silicon nitride.

4. The substrate according to claim 1, wherein the first conductive layer and a first electrode layer or metal wires made from a same material in the substrate are arranged in a same layer and formed by a single manufacturing process; and/or the second conductive layer and a second electrode layer or metal wires made from a same material in the substrate are arranged in a same layer and formed by a single manufacturing process.

5. The substrate according to claim 4, wherein the first electrode layer is a common electrode layer and the second electrode layer is a pixel electrode layer; or the first electrode layer is a pixel electrode layer and the second electrode layer is a common electrode layer.

6. The substrate according to claim 4, wherein the metal wires are gate lines or data lines.

7. The substrate according to claim 1, wherein the first processing chip includes a first peripheral processing circuit which includes a first resistor, a second resistor, an operational amplifier and a first comparator, in which a first input end of the operational amplifier is respectively connected with one end of the first resistor and one end of the second resistor; a second input end of the operational amplifier is grounded; an output end of the operational amplifier is respectively connected with the other end of the second resistor and a first input end of the first comparator; the other end of the first resistor is connected with an output voltage end of the first temperature sensing section; a second input end of the first comparator is connected with a first reference voltage end; and an output end of the first comparator is connected with a first control signal end.

8. The substrate according to claim 1, further comprising: a second temperature sensing section disposed on the base substrate and a second processing chip connected with the second temperature sensing section, wherein the second temperature sensing section is disposed in the peripheral area of the substrate; and the second processing chip is disposed in the peripheral area of the substrate and configured to convert a temperature sensing signal of the peripheral area of the substrate sensed by the second temperature sensing section into a second control signal and output the second control signal.

9. The substrate according to claim 8, wherein the second temperature sensing section includes a resistance sensor arranged in a same layer as metal wires in the substrate.

10. The substrate according to claim 9, wherein the second processing chip includes a second peripheral processing circuit which includes a resistor and a comparator, in which a first input end of the comparator is connected with a reference voltage end; a second input end of the comparator is respectively connected with one end of the resistor and the resistance sensor; an output end of the comparator is connected with a control signal end; and the other end of the resistor is connected with a voltage output end of the second temperature sensing section.

11. The substrate according to claim 8, further comprising: a third processing chip configured to integrate the first processing chip and the second processing chip and convert a temperature sensing signal of the central area of the substrate into a third control signal and output the third control signal.

12. The substrate according to claim 1, wherein the substrate is a color filter (CF) substrate or an array substrate.

13. A display device, comprising the substrate according to claim 1.

14. The substrate according to claim 1, wherein the first processing chip includes a first peripheral processing circuit which includes a first resistor, a second resistor, an operational amplifier and a first comparator, in which a first input end of the operational amplifier is respectively connected with one end of the first resistor and one end of the second resistor; a second input end of the operational amplifier is grounded; an output end of the operational amplifier is respectively connected with the other end of the second resistor and a first input end of the first comparator; the other end of the first resistor is connected with an output voltage end of the first temperature sensing section; a second input end of the first comparator is connected with a first reference voltage end; and an output end of the first comparator is connected with a first control signal end.

15. The substrate according to claim 1, further comprising: a second temperature sensing section disposed on the base substrate and a second processing chip connected with the second temperature sensing section, wherein the second temperature sensing section is disposed in the peripheral area of the substrate; and the second processing chip is disposed in the peripheral area of the substrate and configured to convert a temperature sensing signal of the peripheral area of the substrate sensed by the second temperature sensing section into a second control signal and output the second control signal.

16. The substrate according to claim 15, wherein the second temperature sensing section includes a resistance sensor arranged in a same layer as metal wires in the substrate.

17. A substrate, comprising:
a base substrate;
a first temperature sensing section disposed on the base substrate; and
a first processing chip connected with the first temperature sensing section, wherein
the substrate includes a peripheral area and a central area; one part of the first temperature sensing section is disposed in the peripheral area of the substrate; another part of the first temperature sensing section is disposed in the central area of the substrate; and the first processing chip is configured to convert a temperature sensing signal of a difference between temperatures, which are sensed by the first temperature sensing section, of the central area and the peripheral area of the substrate into a control signal and output the control signal;
the first temperature sensing section includes: a first conductive layer, an intermediate insulating spacer layer and a second conductive layer superimposed on the base substrate in sequence;
the first conductive layer comprises a first end portion, an intermediate portion and a second end portion that are sequentially and directly connected along a first direction, and the second conductive layer comprises a first end portion, an intermediate portion and a second end portion that are sequentially and directly connected along the first direction;
the first end portion of the first conductive layer and the first end portion of the second conductive layer are in direct contact in the peripheral area of the substrate to sense the peripheral area of the substrate, the second end portion of the first conductive layer and the second end portion of the second conductive layer are in direct contact in the central area of the substrate to sense the central area of the substrate, such that the difference between the temperatures of the central area and the peripheral area of the substrate are obtained;
the intermediate portion of the first conductive layer, the intermediate insulating spacer layer, and the intermediate portion of the second conductive layer are sequentially provided along a direction perpendicular to the base substrate;
the substrate further comprises: a second temperature sensing section disposed on the base substrate and a second processing chip connected with the second temperature sensing section;
the second temperature sensing section is disposed in the peripheral area of the substrate; and the second processing chip is disposed in the peripheral area of the substrate and configured to convert a temperature sensing signal of the peripheral area of the substrate sensed by the second temperature sensing section into a second control signal and output the second control signal; and
the second temperature sensing section includes a resistance sensor arranged in a same layer as metal wires in the substrate.

\* \* \* \* \*